United States Patent [19]

Alosi

[11] 4,164,933

[45] Aug. 21, 1979

[54] CONCRETE SOLAR COLLECTORS

[76] Inventor: Anthony C. Alosi, 5050 Tamarus, Apt. 159, Las Vegas, Nev. 89109

[21] Appl. No.: 729,963

[22] Filed: Oct. 6, 1976

[51] Int. Cl.$^2$ ................................................ F24J 3/02
[52] U.S. Cl. .................................. 126/447; 237/1 A; 165/168
[58] Field of Search ............... 126/270, 271; 237/1 A, 237/69; 52/34, 173, 168, 220; 165/168, 169, 170, 45; 4/191, 166

[56] References Cited

U.S. PATENT DOCUMENTS

| | | | |
|---|---|---|---|
| 2,783,639 | 3/1957 | Werner | 237/69 X |
| 3,568,924 | 3/1971 | Chenault | 237/1 |
| 3,821,818 | 7/1974 | Alosi | 4/191 |
| 3,893,506 | 7/1975 | Laing | 237/1 A X |
| 3,918,430 | 11/1975 | Stout et al. | 237/1 A X |
| 4,012,875 | 3/1977 | Hirsch | 52/168 |
| 4,015,586 | 4/1977 | Vroom et al. | 237/1 A |
| 4,020,989 | 5/1977 | Kautz | 237/1 A |
| 4,037,583 | 7/1977 | Bakun et al. | 237/1 A |
| 4,037,652 | 7/1977 | Brugger | 126/271 |

FOREIGN PATENT DOCUMENTS 1658420  4/1970  Fed. Rep. of Germany ............. 52/173

*Primary Examiner*—Samuel Scott
*Assistant Examiner*—Larry Jones
*Attorney, Agent, or Firm*—Cahill, Sutton & Thomas

[57] ABSTRACT

A precast concrete solar collector panel of moldable hardenable material is developed with a serpentine-like passageway disposed in proximity to at least one planar surface of the panel. The passageway serves as a conduit for conveying a fluid to effect a heat transfer intermediate the proximate planar surface of the panel and the fluid rendering the panel useable as a heat collector or as a source of radiant heat, depending upon the relative temperatures between the conveyed fluid and the proximate planar surface. By constructing the panel as a structural member, a plurality of panels can be employed as a roof, exterior building wall, walkway, driveway or fence to receive radiant energy from the sun and transfer the collected heat to the fluid flowing within each of the panels; further panels can be employed as interior walls, ceilings or floors in buildings as sources of radiant heat by passing a heated fluid through the passageways.

9 Claims, 9 Drawing Figures

CONCRETE SOLAR COLLECTORS

The present invention relates to solar heat collectors and, more particularly, to solar heat collector panels developed as integral structural members.

The collection and harnessing of solar energy has been a long sought after goal because of the obvious inexhaustible source of radiant energy. Presently, many solar collectors have been developed which are quite efficient in employing the received radiant energy to raise the temperature of a fluid passed through the collector. Such units, however, are generally relatively easily subject to damage and due precautions must be taken. The amount of heat collected is essentially a function of the surface area subjected to the source of radiant energy as well as the angular orientation of the collector with respect to the source of radiant energy.

In order to increase the amount of heat collected, the total surface area presented by the collectors must be increased. Concurrently, the supporting sub-structure for the panel must be commensurate therewith. These two requirements necessarily render the construction and installation of presently acceptable solar collectors relatively expensive. In inclement environments, wherein the solar collectors may be subjected to seasonal snow loads, adequate precautions must be entertained to preclude damage to them, which further increases the costs.

Because of the essentially fragile nature of presently known solar collectors, they are usually not employed in combination with structures such as building walls or fences whereat they might be damaged by normal activities conducted in their proximity.

It is therefore a primary object of the present invention to provide a solar collector panel which is a structural member of the structure to which it is attached.

Another object of the present invention is to provide a solar collector panel which is of sufficient structural integrity to also serve as a sidewalk or driveway.

Yet another object of the present invention is to provide a solar collector of sufficient structural integrity to serve as a fence.

Still another object of the present invention is to provide a radiant heat panel useable as an interior or exterior wall of a building.

A further object of the present invention is to provide an inexpensively mass produceable radiant energy heat exchange unit.

A yet further object of the present invention is to provide a radiant energy heat exchange unit of moldable hardenable material.

A still further object of the present invention is to provide a plurality of precast solar collector panels interconnectable with one another through external plumbing fixtures.

These and other objects of the present invention will become apparent to thsoe skilled in the art as the description thereof proceeds.

The present invention may be described with greater specificity and clarity with reference to the following figures, in which.

In U.S. Pat. No. 3,821,818, there is described a method developed by the present inventor for forming complex passageways within a block of moldable hardenable material. In essence, this method comprises the development of ice trees representative of the passageways to be formed. After the ice trees are formed, with or without freezing elements disposed therein to maintain the ice trees and preclude melting, the ice trees are inserted within a form representative of the block or panel to be produced. Moldable hardenable material, such as concrete, is poured into the form to encase the ice trees with the latter protruding only at the inlets and outlets of the to be formed passageways. During the curing process of the moldenable hardenable material, the ice trees are maintained in their frozen state by energization of the embedded freezing elements. After curing has been completed, the ice trees are allowed to melt and the subsequently freed freezing elements are withdrawn to leave smooth surfaced passageways of predetermined configuration and size. Depending upon the nature and characteristics of the moldable hardenable material and the characteristics of the fluid to be passed through the passageways, the passageways may be lined with a plastic sealant, epoxy, or similar other material to preclude mechanical or chemical interaction between the fluid and the cured moldable hardenable material.

Figure 1:
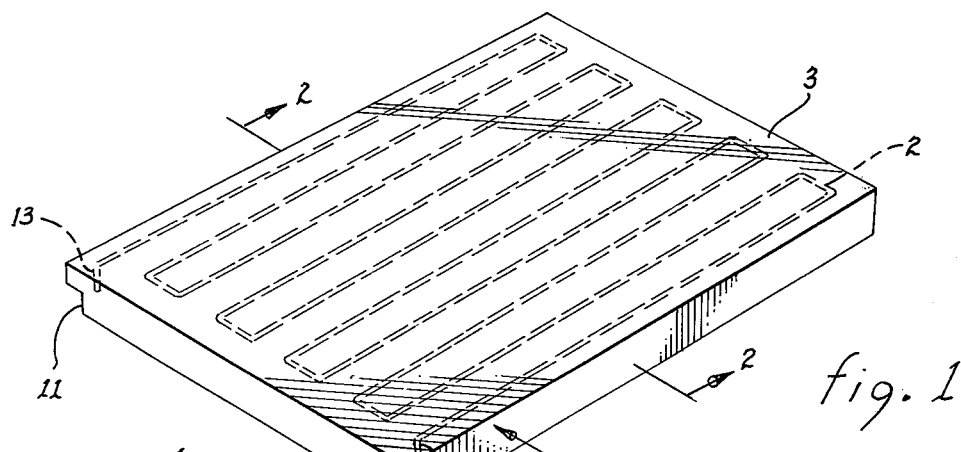
FIG. 1 is a perspective view of a precast solar collector panel.

The precast solar collector panel 1 illustrated in FIG. 1 may be formed by the method described in U.S. Pat. No. 3,821,818. A serpentine-like passageway 2 is formed in sufficient proximity to surface 3 of the panel. The location of the passageway must be shallow enough to establish a satisfactory heat transfer rate from the panel surface to the fluid contained within passageway 2 and it must be deep enough to establish structural rigidity sufficient to protect against collapse of the passageway. Where panel 1 is developed from concrete, the passageway may be embedded one-half to one inch beneath the adjacent panel surface. Access to passageway 2 is provided by means of corner indentations 10 and 11 at adjacent corners of the panel. A stub passageway 12 extends from one terminal point of passageway 2 into indentation 10 and a further stub passageway 13 extends from the other end of passageway 2 into indentation 11.

While accurate figures are not presently available, it is expected that the absorbtion efficiency of the panels will approach 65%. This figure is approximately equivalent to the efficiency of a conventional solar collector having a dirtied transparent front panel.

Figure 2:
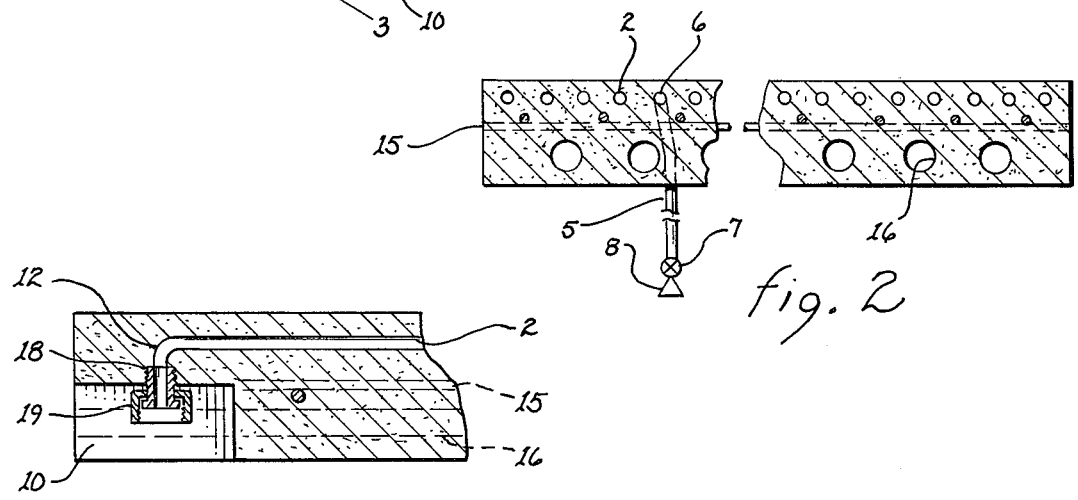
FIG. 2 is a cross-sectional view taken along lines 2—2, as shown in FIG. 1.

In order for the precast solar collector to serve as a structural member as well as a collector of radiant heat, it should be constructed in accordance with accepted precast concrete structures, as illustrated in FIG. 2.

Normally, a mesh of reinforcement bars 15 are encased within the concrete. Moreover, lightening holes or cavities 16 may be employed which reduce the weight of the structure and yet allow the structure to maintain sufficient structural integrity.

To increase the temperature insulation efficiency of the precast solar collector panels, the normally employed cavities (cavities 16 as shown in FIG. 2) may be connected to a vacuum pump. The low pressure within the cavities will reduce the heat transfer capability of the panels and it will aid in reducing sound transmission through the panels. The reduction in heat transfer necessarily has a beneficial effect upon the conservation of energy.

The cavities can also be used for other purposes, such as holding tanks for water, prior or subsequent to flow of the water through the passageways. The necessary fittings and plumbing to accomplish such a result are known to those skilled in the concrete and plumbing arts.

Figure 3:
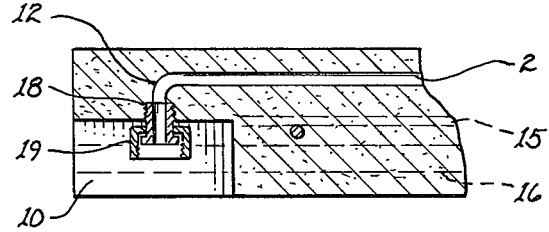
FIG. 3 is a partial cross-sectional view taken along lines 3—3, as shown in FIG. 1.
Figure 4:
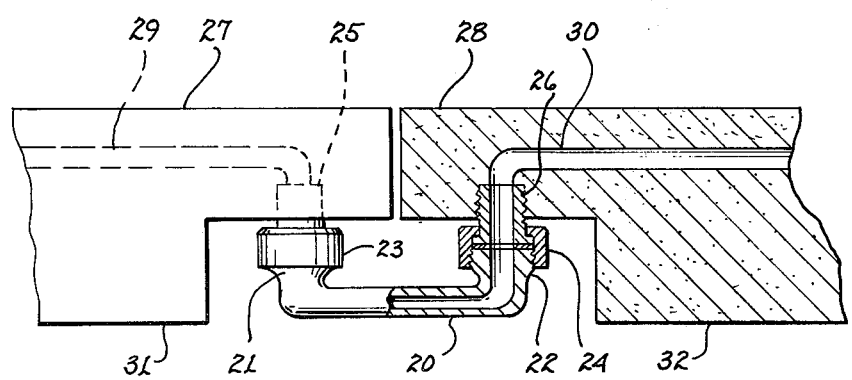
FIG. 4 is a partial cross-sectional view illustrating the external interconnection between two adjacent solar collector panels.

As illustrated in FIGS. 3 and 4, each inlet or outlet of passageway 2 includes a nipple fitting 18 and an attached threaded collar 19. Both the extremity of the nipple and the collar are contained within the respective indentation, such as indentation in FIG. 3. Where the passageways of two adjacently positioned collectors are to be interconnected, a U-shaped fitting 20, as illustrated in FIG. 4, may be employed. The fitting includes externally threaded legs 21 and 22 which threadedly engage collars 23 and 24 extending from nipple fittings 25 and 26 of panels 27 and 28. Thereby, one end of passageway 29 within panel 27 is connected to one end of passageway 30 in panel 28. Preferably, the depth of U-shaped fitting 20 is sized such that it does not extend below lower surfaces 31, 32 of panels 27, 28, respectively.

Figure 5:
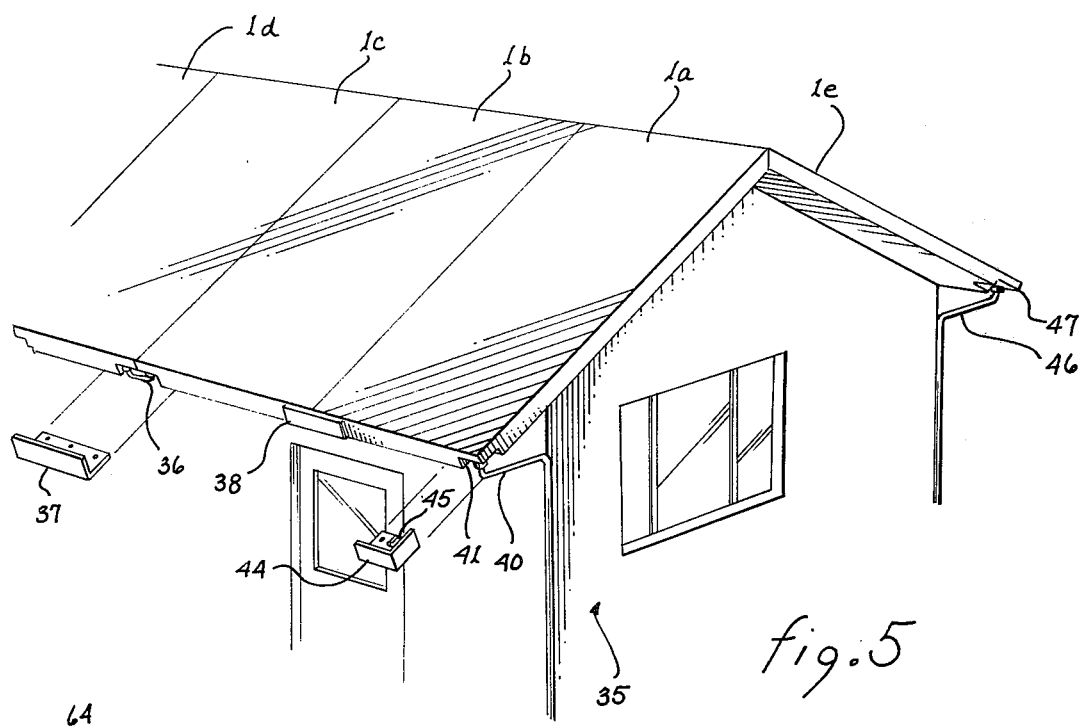
FIG. 5 illustrates a roof of a dwelling developed from the precast solar collector panels of the present invention.

FIG. 5 is a partial view of a dwelling 35 having a plurality of precast solar collector panels 1a, 1b, 1c, 1d and 1e serving as a roof of the dwelling. These panels are supported by conventional roof trusses or other sub-structure normally employed for roofs. Because precast solar collector panels 1a–1e are developed as structural modules, they can and do fulfill all of the requisite load bearing requirements of a roof and do not need an underlying sub-roof for mechanical integrity or expected roof loads. The protruding nipple fittings from passageways within adjacent precast solar collector panels are interconnected by U-shaped fittings 36, similar to fitting 20 illustrated in FIG. 4. This fitting and the indentations within which it is located is covered and yet rendered accessible by means of a cover plate 37 suitably attached to the edges and lower surfaces of panels 1b and 1c. A similar cover plate 38 is disposed at the passageway junction intermediate panels 1a and 1b. At the lower corner of panel 1a, a length of pipe 40 is threadedly attached to the nipple fitting within indentation 41. Pipe 40 serves as a conduit to drain or supply fluid, depending upon the direction of flow, to the serially connected passageways within panels 1a, 1b, 1c and 1d. A corner cover plate 44 having an appropriately configured recess 45 to accommodate pipe 40, is attached to the edges and lower surface of panel 1a to cover and protect indentation 41 and the fittings disposed therein. A pipe 46 extends from one corner of panel 1e to convey fluid to or from the passageway within the panel, depending upon the direction of flow. A cover plate 47 protects the junction of pipe 46 and the nipple fitting extending from the embedded passageway within the panel.

From the above description of the dwelling illustrated in FIG. 5 and the earlier discussion of the precast solar collector panels, it will become apparent that the complete roof of a building may be developed from panels of solar collectors. Thus, the complete roof, and not just segments thereof as is true of prior art structures, can be employed as a collector of radiant energy from the sun. Moreover, for peaked roofs, such as illustrated in FIG. 5, both sides may be developed from solar collector panels so as to take full advantage of the position of the sun during morning, mid-day and afternoon. In the event one side or the other of the roof is not in sunlight during a portion of the day, the flow of fluid therethrough can be terminated by suitable valving arrangements.

Figure 6:
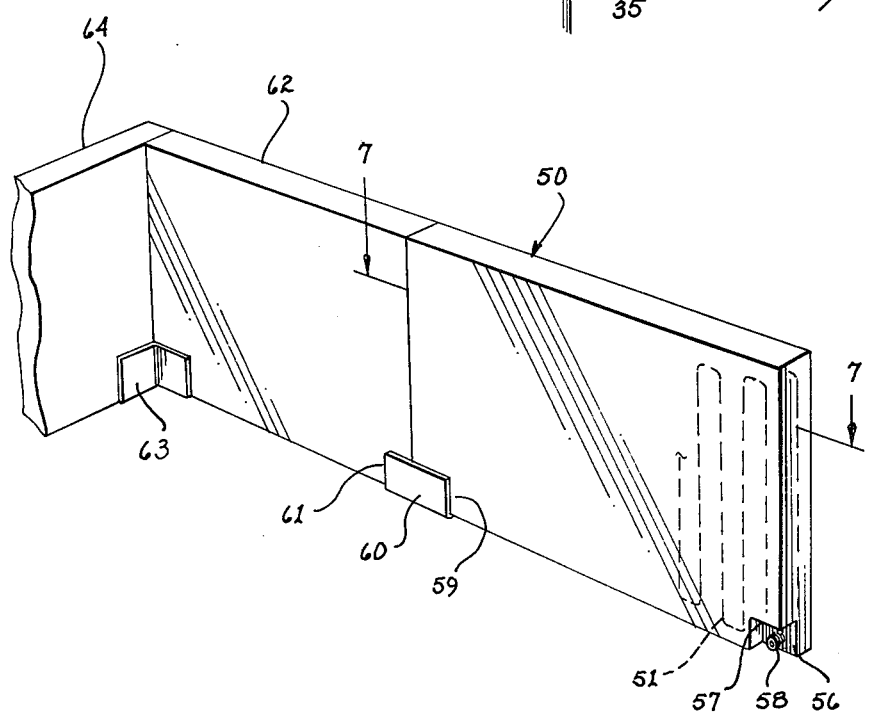
FIG. 6 depicts a fence constructed of precast solar collector panels.
Figure 7:
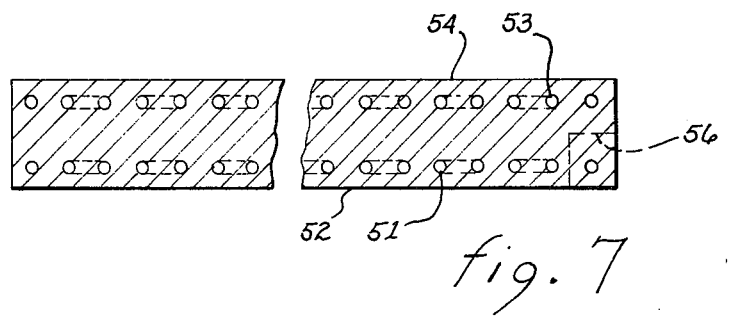
FIG. 7 is a partial cross-sectional view taken along lines 7—7, as shown in FIG. 6.

Presently, fences, such as fences around the backyards of residences, serve little purpose other than that of barriers. The precast solar collector panels of the present invention are particularly suited for use as fences in that they possess the requisite structural integrity. More importantly, when employed as fences, the precast solar collector panels are capable of serving a useful purpose to heat the fluid passed therethrough. Since a fence is vertically oriented and not necessarily aligned perpendicular to the sun's rays during any given time of the day, it is expedient and practical to develop a serpentine passage proximate to each broad side of each fence panel. As with the earlier described roof panels, the serpentine passageway may be as close as one-half inch to the surface if the panel is made of precast concrete and yet be sufficiently robust to withstand normal expected abuse without collapse of a section of the passageway. Panel 50, as illustrated in FIGS. 6 and 7, includes a serpentine passageway 51 disposed adjacent surface 52 and a second serpentine passageway 53 adjacent surface 54. An indentation 56 is disposed at one lower corner of panel 50 to provide a cavity for nipple fittings 57 and 58 extending from their respective serpentine passageways 51 and 53. A similar indentation for the nipple fittings at the other end of serpentine passageways 51 and 53 is developed in the adjacent lower corner 59 of panel 50. Cover plates, such as cover plate 60 covering the indentation at corner 59 and an equivalent indentation at corner 61 of panel 62 protect the nipple fittings and conduit interconnecting the passageway of panels 50 and 62. A further cover plate, such as cover plate 63 is employed at corners of the fence, such as the corner defined by panels 62 and 64.

Figure 8:
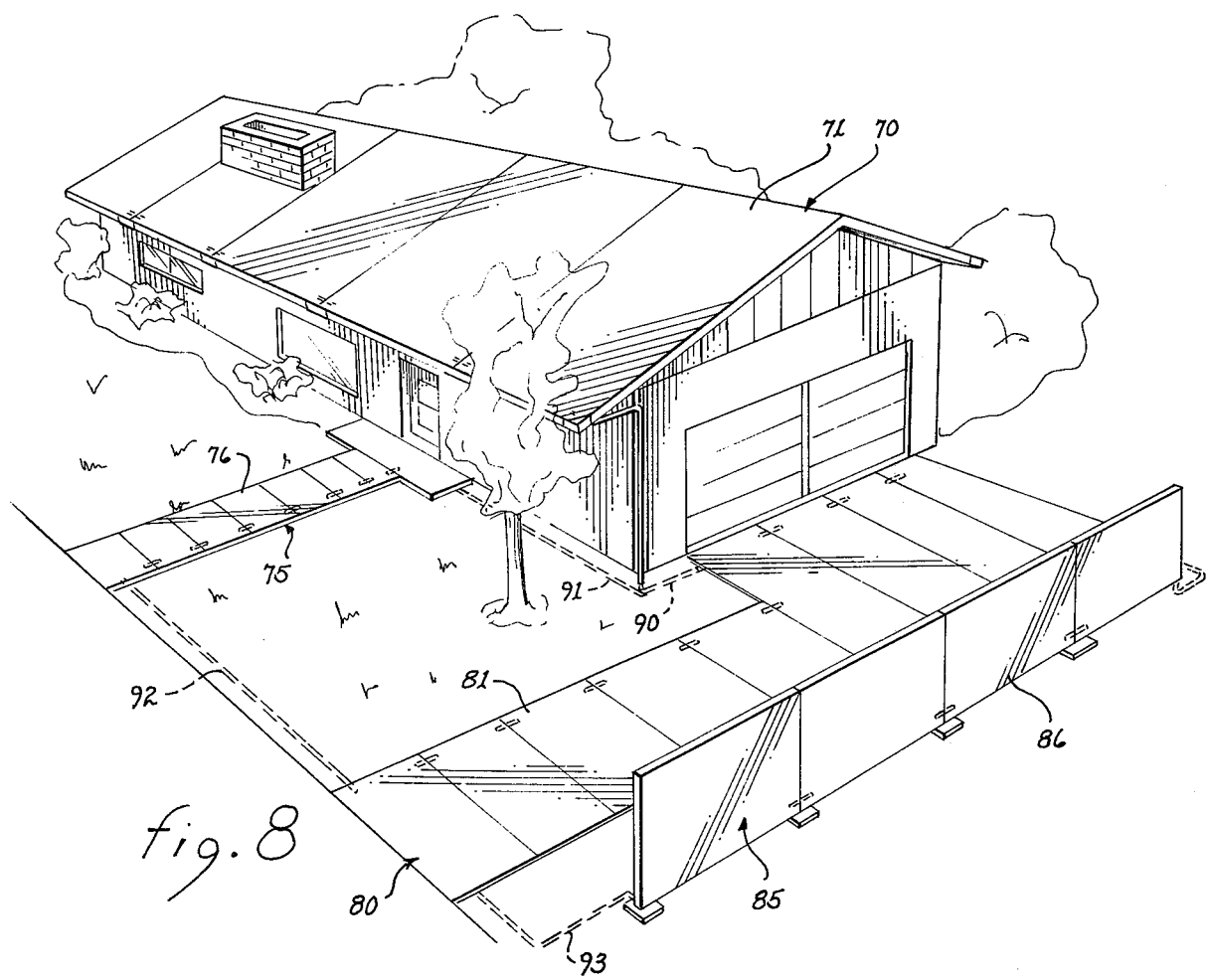
FIG. 8 is a perspective view of a residence and depicts the various uses of the present invention.

FIG. 8 is a representation of a residence and the various locations wherein precast concrete solar collector panels constructed in accordance with the present invention could be employed. By constructing roof 70 from a plurality of precast solar collector panels, such as the panel identified by number 71, the total surface area of the roof can be employed as a collecting surface for the radiant energy irradiated by the sun. For reasons stated above, the structural integrity of each of the panels avoids the necessity of constructing an independent roof system to bear weather loads and provide the requisite water shedding capability. The continuing presence of water within the roof panels renders it readily possible to incorporate a fire preventative sprinkler system within the panels. A pipe or conduit 5 extends from one of the legs (leg 6) of passageway 2 external to the panel and terminates in the ceiling or other convenient fire serving location within the dwelling. A fire sensor and associated valve 7 is disposed at the extremity of conduit 5. A sprinkler 8 discharges any water flowing through conduit 5 in the event of opening of valve 7. In operation, valve 7 will remain closed until tripped in response to heat or smoke (depending upon the type of sensor employed). The water within passageway 6 will flow through conduit 5 and discharge through sprinkler 8. As the water within the passageway is under continuous pressure, water discharge will continue to occur until the source of water is shut-off. Similarly, fire prevention sprinkler heads can also be installed in panels of the type illustrated in FIG. 1 when the latter are used as interior wall and ceiling located sources of radiant heat.

Sidewalk 75 can also be constructed of a plurality of interconnected precast concrete solar collector panels 76. Such a sidewalk will not only serve the normal functions of a sidewalk but also serve as further surface area for collecting the radiant energy irradiated by the sun. Driveway 80 is also constructable from a plurality of interconnected precast concrete solar collector panels to provide yet further surface area for receiving the energy irradiated from the sun. Because of the precast concrete employed to construct the solar collector panel, each panel is of sufficient strength to bear the loads imposed by vehicular traffic upon the driveway. Fence 85, which is commonly employed along the property line of a residence, can be developed from a plurality of interconnected solar collector panels, as described above with respect to FIGS. 6 and 7.

For geographical locations where the surface area irradiated by the sun is to be optimized, the exterior walls of the residence shown in FIG. 8 may also be constructed of the precast solar collector panels described herein.

By interconnecting the various groups of precast solar collector panels by means such as conduits 90, 91, 92 and 93, the fluid, normally water, flowing through the serpentine passageways within each of the panels in all of the groups of panels will be subjected to the heating effects of the radiant energy impinging upon the surfaces of the panels. Such heating, depending of course upon the geographical latitude of the residence and the time of the year, is capable of producing an increase in temperature of the water to approximately 130°. Water of this temperature is normally sufficiently heated to serve all of the domestic needs of a residence. Alternatively, the water can be routed to a conventional water heater for final heating with the panels serving as preheaters.

Because an almost unlimited number of plumbing variations may be entertained, the heating of the fluid within the serpentine passageways of one group of precast solar collector panels can be employed to heat the precast solar collector panels of another group. In example, in northern latitude areas wherein snow is common during the winter, the snow will settle upon the sidewalks and driveways and usually must be manually cleared. Because little if any snow will impinge upon the surfaces of fence 85, the fluid disposed within the serpentine passageways of the fence will be heated by the rays of the sun, even during wintertime. By routing the fluid from the fence through the driveway and the sidewalk, the driveway and the sidewalk will be warmed or raised in temperature to a sufficient degree to bring about melting of any snow lying thereupon. Similarly, the fence may be used as a heat source to heat the water flowing therethrough, which heated water is ultimately conveyed through roof 70 to raise the temperature of the roof and bring about melting of snow or ice which has settled thereon. Once the roof is cleared of ice, the roof may, in turn, be used to generate heated fluid for transmission through sidewalk 75 and driveway 80. During severe inclement weather conditions and when the sun is obscured, it is possible to convey heated water from a water heater internal to the residence through the serpentine passageways within the sidewalk, driveway and roof to clear the latter of snow and ice. Once cleared, these groups of panels can be once again employed to preheat the water flowing into the water heater within the residence and result in an ultimate savings in the cost of heating water during the wintertime.

By having all of the plumbing attachments to the passageways at corners of the panels, substantial savings can be effected during installation of the plumbing as most of it need not be routed interior to the floor or ceiling of the residence. Additionally, repairs, if any, can readily be performed at the accessible inlets and outlets of the panels. To effect such accessibility for the roof panels, the indentations containing the nipple fittings should be within an overhang of the roof. Such an overhang has the further advantage of shading the residence during the summertime without an appreciable negative effect during the wintertime.

Although the interior walls of the residence illustrated in FIG. 8 are not specifically depicted in the figure, such walls may be constructed in the same manner as that of the fence panels illustrated in FIGS. 6 and 7. By connecting the serpentine passageways within the interior wall panels to the fluid flowing from roof panel 70 and/or others of the precast solar collector panels, the interior walls may be warmed and the radiant heat generated thereby will warm the rooms within the residence. The ceilings and floors could also be similarly constructed to effect radiant heat therefrom. Thereby, savings may be effected in the heating costs of the residence.

Although not illustrated, one or more groups of panels can be disposed within a closed circuit for supplying heated water to a swimming pool. As self-cleaning pools already have an essentially continuously running water circulating pump, the group of panels can be connected in series therewith to continuously introduce heated water to the pool. The slight additional load, hence current drain, imposed by the group of panels is insignificant in cost compared to the normal costs of heating a pool electrically or by a gas heater.

Figure 9:
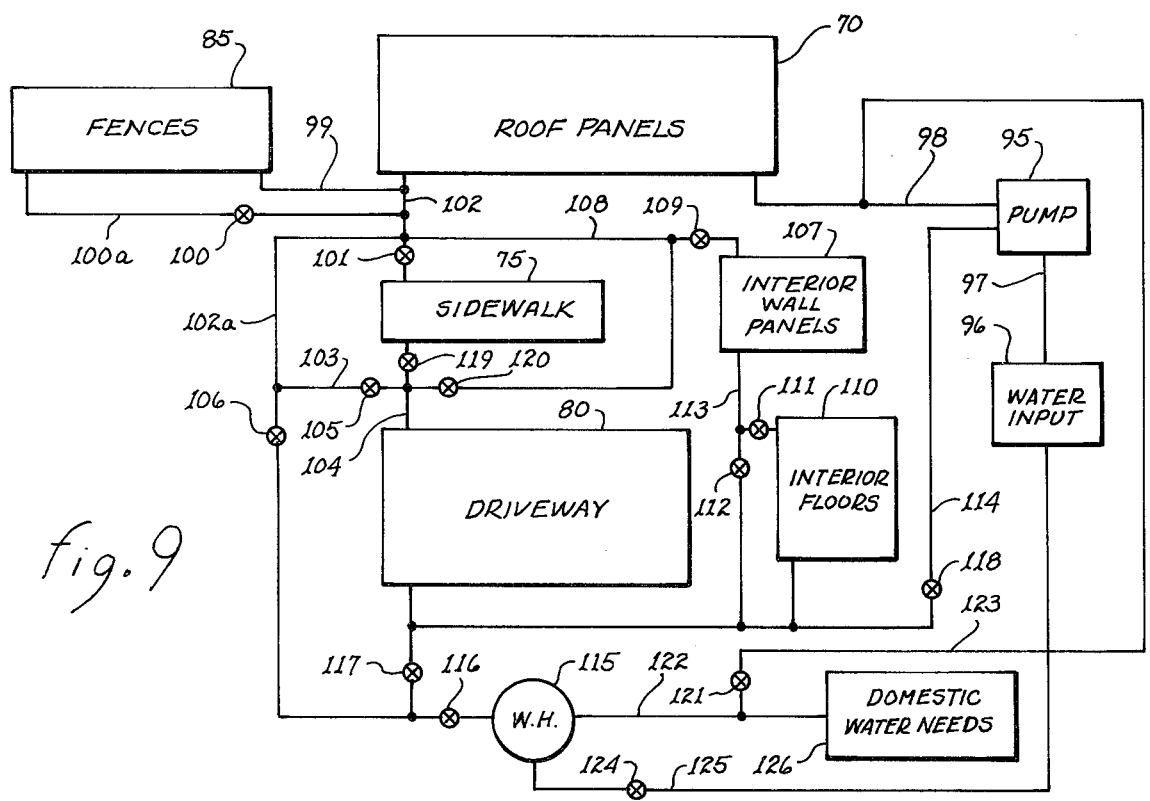
FIG. 9 is a block diagram of a representative fluid flow path between the various solar collector panels illustrated in FIG. 8.

FIG. 9 depicts a representative plumbing circuit for selectively interconnecting the various groups of precast solar collector panels described with respect to the residence illustrated in FIG. 8. A pump 95 conveys the fluid, hereinafter presumed to be water, from water input 96 through conduit 97 and conduit 98 into roof panels 70. The outflow from the roof panels is conveyed through conduit 99 to fence 85, assuming valve 100 within outlet conduit 101 being in the open position. The water flowing from fence 85 may be returned to outlet conduit 102. From conduit 102, the water flows to sidewalk 75, depending on the state of valve 101, through conduits 102a, 103 and 104 to driveway 80, depending upon the state of valves 105 and 106, to interior wall panels 107 through conduit 108, depending upon the state of valve 109, and to interior floors 110 through conduit 113, depending upon the state of valves 111 and 112. The output from each of these groups of panels ultimately flow into a common conduit 114 for conveyance of the water flow back to pump 95 or to water heater 115, depending upon the state of valves 116, 117 and 118. Additional valves, such as valves 119 and 120 may be employed with the existing conduit or additional conduit to provide alternate routing of the flow of water to or from the identified groups of panels. When one or more of the groups of panels are to be heated by water from water heater 115, valve 121 is opened to accommodate flow of hot water through conduits 122 and 123 into a selected one or more of the groups of panels. Where none of the groups of panels are to be employed for preheating the water flowing into water heater 115, valve 124 disposed within conduit 125 interconnecting water input 96 and water heater 115 is opened. Thereby, water heater 115 is supplied directly from water input 96 and is available for the domestic needs, as depicted by block 126.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A monolithic precast solar collector roof panel, each said roof panel comprising in combination:
    a. reinforcement means contained in said roof panel for increasing the load bearing capability of each said roof panel to withstand the expected roof loads;
    b. a fluid conveying passageway formed within said roof panel and defined by the material of said roof panel, said passageway being disposed in proximity to the exterior surface of said roof panel for subjecting the conveyed fluid to the thermal influence of the exterior surface, said passageway having input and output ends;
    c. a source of fluid interconnected with the input end of said passageway for supplying a flow of fluid through said passageway; and
    d. heat exchange unit interconnected with the output end of said passageway for receiving a flow of fluid from said passageway;
   whereby, the increase in thermal energy of the exterior surface of said roof panel irradiated by the sun is transferred to the fluid flowing through said passageway and delivered to said heat exchange unit.

2. The panel as set forth in claim 1 wherein said passageway is serpentine to increase the length of time the fluid flowing within said passageway is subjected to the thermal influence of the exterior surface of the panel.

3. A plurality of monolithic precast solar collector panels for use as the roof of a building, each said panel comprising in combination:
    a. reinforcement means contained in said panel for increasing the load bearing capability of each of said panels to withstand the expected roof loads;
    b. a fluid conveying passageway having input and output ends and disposed in proximity to the exterior surface of said panel for subjecting the conveyed fluid to the thermal influence of the exterior surface, said passageway being serpentine to increase the length of time the fluid flowing within said passageway is subjected to the thermal influence of the exterior surface of the panel;
    c. indention means disposed within each said panel for enveloping the input and output ends of said passageway and a cover plate removably attached to each of said indentation means for protecting the input and output ends of said passageway;
    d. a source of fluid interconnected with the input end of said passageway for supplying a flow of fluid through said passageway; and
    e. a heat exchange unit interconnected with the output end of said passageway for receiving a flow of fluid from said passageway;
   whereby, the increase in thermal energy of the exterior surface of each of said panels irradiated by the sun is transferred to the fluid flowing through said passageway and delivered to said heat exchange unit.

4. The panel as set forth in claim 3 wherein said panels of the roof extend beyond the exterior walls of the building and said indentation means are disposed within the extending edge of said panels; whereby interconnections to and from each of said panels are external to the building.

5. The panel as set forth in claim 4 including fitting means for interconnecting the output end within one of said panels with the input end of an adjacent one of said panels.

6. The panel as set forth in claim 5 wherein said fitting means is contained within said indentation means and protected by said cover plate.

7. A system for increasing the surface area available to collect the energy irradiated by the sun at a residential location by constructing the roof and ground supported appurtenances from a plurality of interconnected precast solar collector panels, said system comprising in combination:
    a. a moldable hardenable material cured in the configuration of each said panel and including reinforcement means for establishing each said panel of sufficient structural rigidity to satisfy all load bearing requirements at its place of use;
    b. a passageway developed within said material of each said panel during curing of said material and defined by said cured material for conveying a fluid through the respective one of said panels, each said passageway being disposed in proximity to the panel surface irradiated by the sun and to reduce the heat transfer losses between the irradiated panel surface and the fluid;
    c. fitting means for interconnecting a group of said panels in series;
    d. valve and conduit means for regulating the flow of fluid to and from groups of said panels;
    e. a source of fluid under pressure for establishing a flow of fluid through interconnected ones of groups of said panels; and
    f. a heat transfer unit for receiving the fluid heated within groups of said panels.

8. A system for increasing the surface area available to collect the energy irradiated by the sun at a residential location by constructing the roof and ground supported appurtenances from a plurality of interconnected precast solar collector panels, said system comprising in combination:
    a. a moldable hardenable material cured in the configuration of each said panel and including reinforcement means for establishing each said panel of sufficient structural rigidity to satisfy all load bearing requirements at its place of use;
    b. a passageway developed within said material of each said panel for conveying a fluid through the respective one of said panels, each said passageway being disposed in proximity to the panel surface irradiated by the sun and to reduce the heat transfer losses between the irradiated panel surface and the fluid;

c. fitting means for interconnecting a group of said panels in series;

d. valve and conduit means for regulating the flow of fluid to and from groups of said panels;

e. a source of fluid under pressure for establishing a flow of fluid through interconnected ones of groups of said panels;

f. a heat transfer unit for receiving the fluid heated within groups of said panels; and g. a fire prevention system formed as part of the group of said panels defining the roof, said fire prevention system comprising in combination:
i. a sprinkler head;
ii. a conduit interconnecting said sprinkler head with said passageway within at least one of said panels; and
iii. valve means for regulating the flow of fluid from said passageway to said sprinkler.

9. The system as set forth in claim 8 wherein said panels include cavities disposed therein for storing said fluid.

* * * * *